(12) United States Patent
Zidan et al.

(10) Patent No.: US 8,883,109 B2
(45) Date of Patent: Nov. 11, 2014

(54) HIGH CAPACITY STABILIZED COMPLEX HYDRIDES FOR HYDROGEN STORAGE

(75) Inventors: Ragaiy Zidan, Aiken, SC (US); Rana F. Mohtadi, Northville, MI (US); Christopher Fewox, Pasadena, TX (US); Premkumar Sivasubramanian, Ann Arbor, MI (US)

(73) Assignees: Toyota Motor Engineering & Manufacturing North America, Inc., Erlanger, KY (US); Savannah River Nuclear Solutions, LLC (SRNS), Aiken, SC (US)

( * ) Notice: Subject to any disclaimer, the term of this patent is extended or adjusted under 35 U.S.C. 154(b) by 396 days.

(21) Appl. No.: 13/382,751

(22) PCT Filed: Jul. 9, 2010

(86) PCT No.: PCT/US2010/041533
§ 371 (c)(1),
(2), (4) Date: Feb. 29, 2012

(87) PCT Pub. No.: WO2011/006071
PCT Pub. Date: Jan. 13, 2011

(65) Prior Publication Data
US 2012/0156118 A1 Jun. 21, 2012

Related U.S. Application Data

(60) Provisional application No. 61/270,511, filed on Jul. 9, 2009.

(51) Int. Cl.
*C01B 6/23* (2006.01)
*C01B 6/13* (2006.01)
*C01B 6/34* (2006.01)

(52) U.S. Cl.
CPC .............. *C01B 6/34* (2013.01); *Y02E 60/328* (2013.01); *Y02E 60/364* (2013.01); *Y02E 60/327* (2013.01); *C01B 6/23* (2013.01); *Y10S 420/90* (2013.01)
USPC .......................... 423/286; 420/900; 423/648.1

(58) Field of Classification Search
CPC ..................................... C01B 3/00; C01B 3/02
USPC ............... 420/900; 423/648.1, 644; 206/0.07
See application file for complete search history.

(56) References Cited

U.S. PATENT DOCUMENTS

2006/0013753 A1* 1/2006 Vajo et al. ................. 423/286

FOREIGN PATENT DOCUMENTS

CN        1938220 A      3/2007
EP        1 867 602      12/2007
(Continued)

OTHER PUBLICATIONS

Hemmelshøj et al. "Density functional theory based screedning of ternary alkali-transition metal borohydrides: A computational material design project" Jul. 1, 2009, Journal of chemical physics, 131, 014101.*

(Continued)

*Primary Examiner* — Stanley Silverman
*Assistant Examiner* — Syed Iqbal
(74) *Attorney, Agent, or Firm* — Oblon, Spivak, McClelland, Maier & Neustadt, L.L.P.

(57) ABSTRACT

Complex hydrides based on $Al(BH_4)_3$ are stabilized by the presence of one or more additional metal elements or organic adducts to provide high capacity hydrogen storage material.

21 Claims, 21 Drawing Sheets

(56) References Cited

FOREIGN PATENT DOCUMENTS

EP     1 867 602 A3     12/2007
EP     1867602 A2 *     12/2007

OTHER PUBLICATIONS

European Search Report issued Aug. 30, 2013 in Patent Application No. 10797917.1.
Combined Office Action and Search Report issued Aug. 19, 2013 in Chinese Patent Application No. 201080030901.5 (with English language translation of Office Action only).
Von M. Ehemann, et al. "B-kernresonanzspektroskopische Untersuchungen der Systeme LiBH4/Al9BH4)3, etc" Zeitschrift fur anorganische and allgemeine Chemie, vol. 394, 1972, pp. 33-52.
H-W. Li et al, "Materials designing of metal borohydrides: Viewpoints from thermodynamical stabilities" Journal of Alloys and Compounds, 2007, pp. 315-318.
Hummelshoj, J.S., et al., "Density functional theory based screening of ternary alkali-transition metal borohydrides: A computational material design project," The Journal of Chemical Physics, vol. 131, pp. 1-9, (Jul. 1, 2009).
International Search Report Issued Oct. 18, 2010 in PCT/US10/41533 Filed Jul. 9, 2010.
Combined Office Action and Search Report issued Apr. 22, 2014 in Chinese Patent Application No. 201080030901.5 with English translation and English translation of categories of cited documents.
Office Action issued Apr. 8, 2014 in Japanese Patent Application No. 2012-519762 (with English language translation).
L.V. Titov, et al., "Complex of aluminum borohydride with calcium borohydride", Bulletin of the Academy of Sciences of the USSR, Division of Chemical Science, vol. 24, No. 5, Dec. 10, 1975, pp. 1095-1096 with cover pages.
John K. Ruff, "The amine complexes of aluminum hydride. V. hydrido aluminum borohydride derivatives", Inorganic Chemistry, vol. 2, No. 3, Jun. 1963, pp. 515-519 with cover page.
H.I. Schlesinger, et al., "The preparation of other borohydrides by metathetical reactions utilizing the alkali metal borohydrides", Journal of the American Chemical Society, vol. 75, No. 1, Jan. 5, 1953, pp. 209-213 with cover page.

* cited by examiner

Experimental (1) Reactants

*Alanates:*
- $NaAlH_4$, $\Delta H_f = -115$ kJ/mol
- $MgCl_2:LiAlH_4$*, $\Delta H_f$ $Mg(AlH_4)_2 = -63$ kJ/mol
- $CaCl_2:LiAlH_4$**, $\Delta H_f$ $Ca(AlH_4)_2 = -82.97$ kJ/mol

*Boron hydrides:*
- $LiBH_4$, $\Delta H_f = -190.46$ kJ/mol

*, **: Ca and Mg alanate halide with $LiAlH_4$ used as substitute for separate synthesis of Ca and Mg alanate 2) Reaction vessels (synthesis)
- Planetary ball mill, Fritsch P.7, 316L jars, milled 3 hr @500 rpm
- High pressure (up to 4500 psi)/temperature (up to 350 °C) manifold 3) Characterization
- X ray diffraction PXRD
- Thermal analysis, TPD, TG-DTA; heating rate 2 °C/min
- Magic angle spinning MAS NMR

*Fig. 8*

Ca-alanate (CaCl$_2$:LiAlH$_4$)-xLiBH$_4$ systems

1) Formation of LiCl
2) Absence of LiBH$_4$
3) Absence of Ca(AlH$_4$)$_2$ clean XRD in literature; Ca(AlH$_4$)$_2$ ID peaks makes analysis inappropriate 1) 1st decomposition step is endothermic decomposition step→Ca(AlH$_4$)$_2$ is not present in the sample (exothermic, see DTA comparison) - Reversibility potential
2) LiBH$_4$ presence in the sample is indicated based on phase transformation and melting

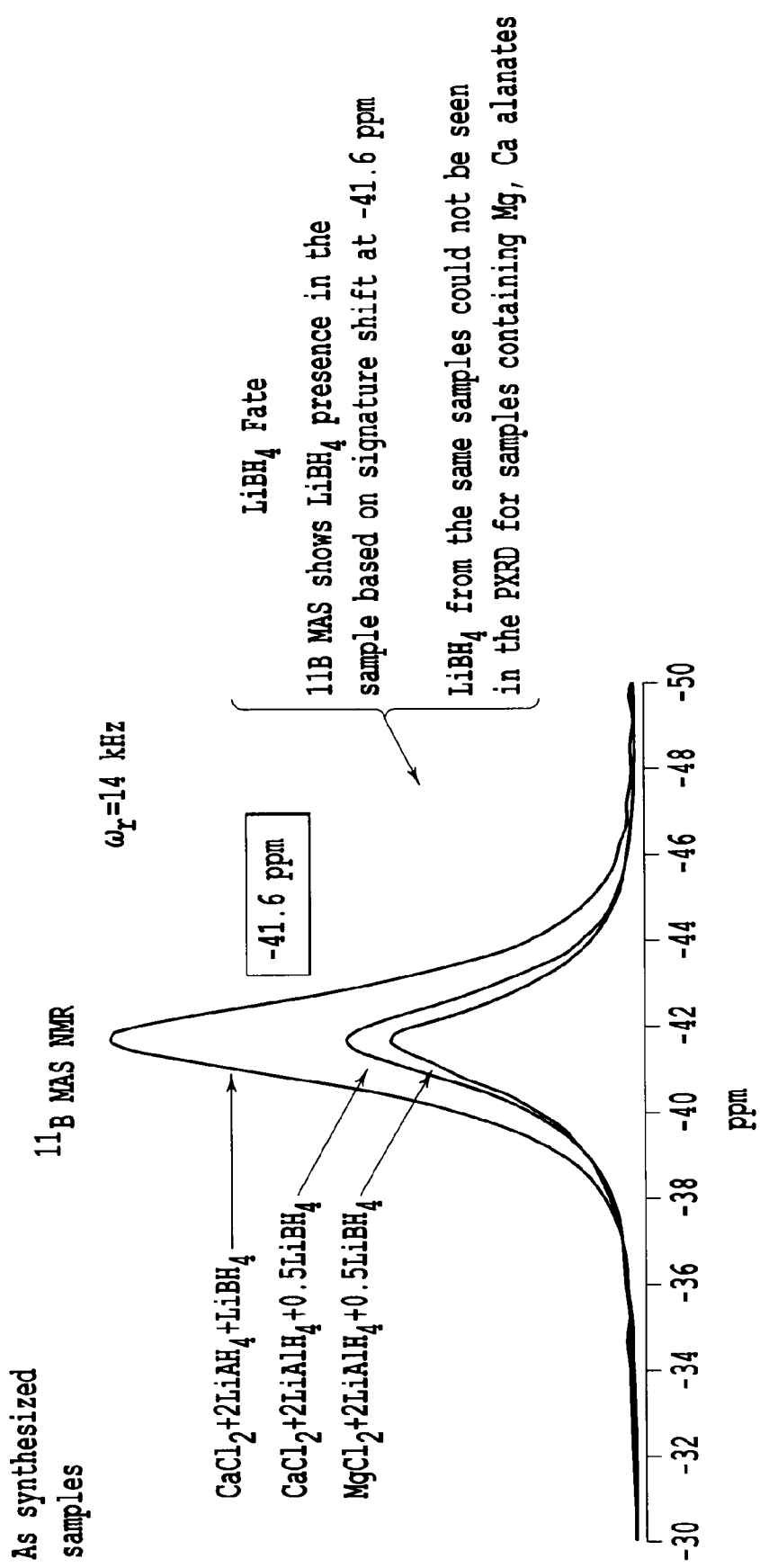

MAS NMR results*

Ca based systems

Ca based systems

SUMMARY

- Ionic exchanges observed showed that hydrides chemical reactions are driven by the system thermodynamics

- $LiBH_4$ promoter effects clearly observed:

1) Rate and onset decomposition lowered by 50°C for Mg alanate: $xLiBH_4$ system 2) Rate and onset decomposition modified for Ca alanate:$xLiBH_4$ system-Endothermic decomposition in the presence of $LiBH_4$ observed 3) $LiBH_4$ present as amorphous following milling for Mg and Ca alanates systems and was observed in MAS NMR Formation of $Ca(AlH_4)(BH_4)$ or $Mg(AlH_4)(BH_4)$ ☐ ☐

HIGH CAPACITY STABILIZED COMPLEX HYDRIDES FOR HYDROGEN STORAGE

REFERENCE TO RELATED APPLICATIONS

This application claims benefit of U.S. provisional application 61/270,511 filed Jul. 9, 2009, the entire contents of which are incorporated herein by reference.

This invention was made with government support under Contract No. DE-AC09-08SR22470 awarded by the U.S. Department of Energy. The government has certain rights in the invention.

FIELD OF THE INVENTION

The present invention relates to materials for hydrogen storage. In particular, the present invention relates to complex hydrides for hydrogen storage. This invention is also directed towards stabilized high capacity complex hydrides useful for hydrogen storage. The invention is further directed to methods and processes for making stabilized high capacity complex hydrides, such processes and methodology lending themselves toward economical and safer techniques of producing stabilized high capacity complex hydrides.

DISCUSSION OF THE BACKGROUND

This invention relates in part to metal hydrides and complex hydrides that may be used to form a stable hydrogen capacity for hydrogen cycling. There remains a need for improvements in metal and complex hydrides with respect to hydrogen storage capacity, dehydriding temperatures, and reversibility of the hydrogen sorption and desorption cycles. For instance, it is known in the art as set forth in U.S. Pat. No. 7,094,387 directed to molten state processes of forming unique metal hydrides and complex metal hydrides. However, there remains room for improvement and variation in the art directed to techniques and resulting materials to form stabilized high capacity complex hydrides.

Currently hydrogen is stored on board a vehicle under 5,000 to 10,000 psi pressure. However, these storage systems are not efficient from a volumetric point of view. For example, the storage density of hydrogen gas at 10,000 psi is only 0.035 g/cm$^3$, which is approximately half the storage density of liquid hydrogen at the 20K boiling point of hydrogen. Despite the higher storage density, liquid hydrogen is an undesirable storage form due to hydrogen liquefaction storage loss and short lived dormancy at 20K due to boil off.

Complex metal hydrides, such as alanates (e.g., LiAlH$_4$, NaAlH$_4$ and KAlH$_4$) and borohydrides (e.g., LiBH$_4$, NaBH$_4$ and KBH$_4$), show promise as materials for solid state storage of hydrogen. For example, the theoretical hydrogen volumetric storage density in lithium borohydride (LiBH$_4$) is approximately 0.12 g/cm$^3$, more than three times the density of gaseous hydrogen at 10,000 psi.

However, many complex metal hydrides are unsuitable for hydrogen storage applications. For example, Al(BH$_4$)$_3$ is an unstable compound, and its vapor ignites spontaneously on exposure to air containing only traces of moisture.

A great deal of research is currently underway with other complex hydride compounds and materials to determine the most efficient and useful hydrogen storage material.

There is a need for solid state hydrogen storage materials having improved chemical stability, stable hydrogen capacity with cycling, and enhanced kinetics compatible with automotive and other portable power source requirements.

SUMMARY OF THE INVENTION

The present invention provides a complex metal hydride compound that has improved chemical stability and thermodynamic characteristics that can be tuned to satisfy the on-board hydrogen storage requirements of various automotive and portable power source applications.

The complex compound of the present invention has a composition in which the normally unstable Al(BH$_4$)$_3$ compound is stabilized by the addition at least one BH$_4^-$ group and at least one element other than Al selected from the group consisting of metals.

The complex compound can have the composition M$^{x+}$Al$^{3+}$(BH$_4^-$)$_{3+x}$, where M is an element other than Al selected from the group consisting of metals; and x is a valence number (oxidation number) of 1, 2, 3, 4, 5, 6, 7 or 8.

The complex compound can also have the composition M1$^{x+}$M2$^{y+}$Al$^{3+}$(BH$_4^-$)$_{3+x+y}$, where M1 and M2 are different elements other than Al selected from the group consisting of metals; x is a valence number of 1, 2, 3, 4, 5, 6, 7 or 8; and y is a valence number of 1, 2, 3, 4, 5, 6, 7 or 8.

The complex compound can also have the composition of Al(BH$_4$)$_3$:R, where R is an organic adduct.

The stabilized aluminum borohydride complex compound of the present invention can be produced by a Lewis base reaction. The complex compound can be stabilized in organic solvent.

BRIEF DESCRIPTION OF THE DRAWINGS

The preferred embodiments of the invention will be described in detail, with reference to the following figures, where:

FIGS. 8-18 show various aspects of the present invention.

DETAILED DESCRIPTION OF PREFERRED EMBODIMENTS

Figure 1:
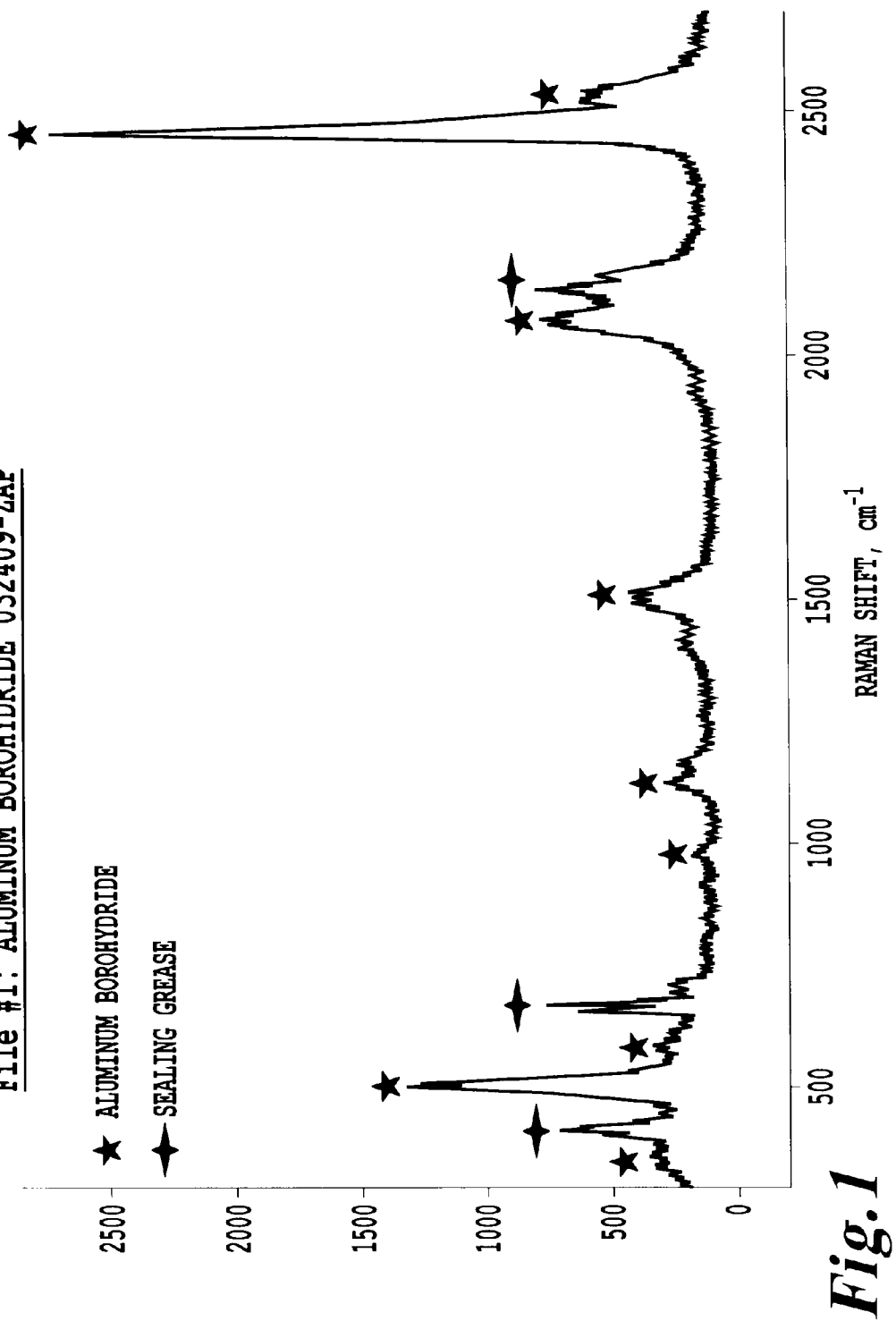
FIG. 1 is a Raman spectrum for unsolvated Al(BH$_4$)$_3$.

The complex compound of the present invention is based on Al(BH$_4$)$_3$, which is a very unstable liquid complex hydride. The present inventors have discovered the addition of one or more metal elements and one or more BH$_4^-$ groups to the Al(BH$_4$)$_3$ complex results in a new aluminum borohydride complex compound having greater chemical stability and higher hydrogen storage capacity than Al(BH$_4$)$_3$.

In embodiments, the complex compound can have the composition M$^{x+}$Al$^{3+}$(BH$_4^-$)$_{3+x}$, where M is an element other than Al selected from the group consisting of metals; and x is a valence number of 1, 2, 3, 4, 5, 6, 7 or 8. Preferably x is 1 or 2. For example, the complex compound can be LiAl(BH$_4$)$_4$, NaAl(BH$_4$)$_4$, MgAl(BH$_4$)$_5$, for example.

In other embodiments, the complex compound can have the composition $M1^{x+}M2^{y+}Al^{3+}(BH_4^-)_{3+x+y}$, where M1 and M2 are different elements other than Al selected from the group consisting of metals; x is a valence number of 1, 2, 3, 4, 5, 6, 7 or 8; and y is a valence number of 1, 2, 3, 4, 5, 6, 7 or 8. Preferably x is 1 or 2, and y is 1 or 2. For example, the complex compound can be $LiNaAl(BH_4)_5$, $LiMgAl(BH_4)_6$, for example.

In still other embodiments, the complex compound can have the composition $M1^{x+}M2^{y+}Al^{3-}(BH_4^-)_{3+x+y}$, where M1 and M2 are the same element other than Al selected from the group consisting of metals; and x and y are different valence numbers of 1, 2, 3, 4, 5, 6, 7 or 8.

As discussed above, M, M1 and M2 are metal elements other than Al. Metal elements other than Al include alkali metals, alkaline earth metals, transition metals, rare earth elements, Ga, In, Sn, Pb and Bi.

Preferred alkali metals include Li, Na and K.

Preferred alkaline earth metals include Mg, Ca, Ba and Sr.

Preferred transition metals include Sc, Ti, V, Cr, Mn, Fe, Co, Ni, Cu, Zn, Y, Zr, Nb, Mo, Ru, Rh, Pd, Ag, Cd, Hf, Ta, W, Re, Os, Ir, Pt and Au.

Preferred rare earth elements are the lanthanide series rare earth elements. Lanthanide series rare earth elements include La, Ce, Pr, Nd, Pm, Sm, Eu, Gd, Tb, Dy, Ho, Er, Tm, Yb and Lu.

In still yet other embodiments, the complex compound can have the composition $Al(BH_4)_3$:R, where R is an organic adduct. For example, R can be an amine or a phosphine. Preferred amines include trimethyl amine and triethylene diamine (TEDA). Preferred phosphines include trimethyl phosphine.

The complex compound of the present invention can be produced by reacting unstable aluminum borohydride ($Al(BH_4)_3$) with a stabilization agent.

In a first synthetic pathway to the stabilized complex compound of the present invention, unsolvated $Al(BH_4)_3$ is synthesized by combining in an inert environment (e.g., a commercial chemical reactor and/or Schlenk line flask) aluminum chloride ($AlCl_3$) with lithium borohydride ($LiBH_4$). The $LiBH_4$ can be premilled to reduce its particle size and enhance the yield of $Al(BH_4)_3$.

Reactions and syntheses described herein, including the synthesis of the unsolvated $Al(BH_4)_3$, can be carried out, for example, at temperatures in a range of from −50 to 600° C., preferably 0 to 400° C., for a period of time in a range of from 0.1 to 100 hours. The pressure can be maintained in a range of from 0 to 6000 psi, for example.

The unsolvated $Al(BH_4)_3$ then undergoes a stabilization reaction with a stabilization agent. For producing the complex compound of the composition $M^{x+}Al^{3+}(BH_4^-)_{3+x}$, the stabilization agent comprises the metal M. For producing the complex compound of the composition $M1^{x+}M2^{y+}Al^{3+}(BH_4^-)_{3+x+y}$, the stabilization agent comprises the metals M1 and M2. The stabilization agent can include one or more metals in metallic form (e.g., metallic Na and metallic K). The stabilization agent can also include one or more compounds of one or more metals. Metals M1 and M2 can both be in one of the compounds or can be in separate compounds. The stabilization agent can be a borohydride of a metal (e.g., $LiBH_4$, $KBH_4$, or $Mg(BH_4)_2$) or a halide of a metal (e.g., LiCl), etc.

For producing the complex compound of composition $Al(BH_4)_3$:R, the stabilization agent can comprise an organic compound with electron donor ligands, such as amine compounds and phosphine compounds. Examples of the amine compounds include trimethyl amine ($N(CH_3)_3$) and triethylene diamine ($N(CH_2CH_2)_3N$, TEDA). Examples of the phosphine compounds include trimethyl phosphine ($P(CH_3)_3$).

Excess unsolvated $Al(BH_4)_3$ can be used in the stabilization reaction. The stabilization reaction for the unsolvated $Al(BH_4)_3$ can be carried out at temperatures in a range of from 25 to 100° C., for example, for a period of time in a range of from 18 to 24 hours, for example. During the synthesis, the pressure can be maintained in a range of from 0 to 1000 psig, for example.

Preferably the stabilization reaction is carried out in an inert environment.

The inert environments for the unsolvated $Al(BH_4)_3$ synthesis and for the stabilization reaction can contain one or more inert gases. Inert gases include He, Ne, Ar, Kr and Xe. Preferably, the inert gas is Ar.

When utilizing alkali metals (e.g., metallic Na or metallic K) as stabilization agents, the stabilization reaction can be conducted at temperatures at or higher than the melting point of the alkali metal and lower than the decomposition temperature of the $Al(BH_4)_3$. Such conditions can enhance the yield of the stabilized complex compound of the present invention through vapor/liquid-liquid reactions.

The formation of the complex compound of the present invention can be marked by the transformation of a liquid $Al(BH_4)_3$ phase into a solid phase of stabilized complex compound.

In a second synthetic pathway to the stabilized complex compound of the present invention, solvated aluminum borohydride ($Al(BH_4)_3$) is synthesized by combining in an inert environment (e.g., Schlenk line flask) aluminum chloride ($AlCl_3$) solvated in an aprotic solvent and lithium borohydride ($LiBH_4$) premixed with the aprotic solvent.

The solvated $Al(BH_4)_3$ then undergoes a stabilization reaction with one of the stabilization agents discussed above to produce the stabilized complex compound of the present invention.

The aprotic solvent can be dimethylformamide, dimethyl sulfoxide, benzene or toluene. Preferably, the aprotic solvent is toluene.

The stabilization reaction of $Al(BH_4)_3$ in solvent permits safer handling of unstable $Al(BH_4)_3$ reactant, higher yield and greater purity of products. The formation of volatile intermediates that can be difficult and expensive to handle can be avoided.

The stabilized complex compound produced is a solid. Traces of solvent can be separated from the solid product by applying a vacuum.

The stabilized solid aluminum borohydride complex compounds of the present invention can release hydrogen at temperatures of less than 200° C.

It is another aspect of at least one of the present embodiments to provide for a process of combining $AlH_4$ groups and $BH_4$ groups, to produce a high capacity hydride for hydrogen storage.

It is a further aspect of at least one embodiment of the present invention to provide for a process and resulting product of reacting $Al(BH_4)_3$ which is dissolved in an organic solvent such as toluene or benzene and then reacted with a fine powder of $M^x(BH_4)_x$ to form $M''Al(BH_4)_{3+x}$ where M is selected from the group consisting of Li, Na, K, or Mg to produce a high capacity hydride for hydrogen storage.

It is a further aspect of at least one embodiment of the present invention to provide for a reaction and a resulting product of combining $Al(BH_4)_3$ in either a liquid or gas form with a molten metal "M" where M is selected from the group of Li, Na, K, or Mg to produce high capacity hydride for hydrogen storage having the general form of $[M^xAl(BH_4)_{3+x}]$.

It is a further object of at least one embodiment of the present invention to provide for a process and resulting reaction product of reacting Al(BH$_4$)$_3$ dissolved in an organic solvent interacting with a molten metal "M" under elevated pressures and temperatures to form a high capacity hydride hydrogen storage in the form of M$^x$Al(BH$_4$)$_{3+x}$.

Complex hydrides described herein are based on an unstable liquid complex hydride of Al(BH$_4$)$_3$. In accordance with the present invention, it has been found that by adding another element to the Al(BH$_4$)$_3$ complex a more stable and higher capacity hydride may be formed having a general formula of M$^x$Al(BH$_4$)$_{3+x}$ where M is a metal and X is a valence number. It has been found that the resulting complexes offer improvements for hydrogen storage applications. Further, it has been found that new synthesis techniques can avoid the formation of volatile intermediates, thereby reducing the difficulty of production and the expense of handling volatile intermediates.

Direct Formation

The formation Al(BH$_4$)$_3$ as starting material is known and occurs by mixing LiBH$_4$ and AlCl$_3$ and stirring and heating.

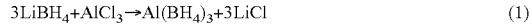

3LiBH$_4$+AlCl$_3$→Al(BH$_4$)$_3$+3LiCl        (1)

The Al(BH$_4$)$_3$ is collected by heating and cold trapping.

One aspect of the invention is to form M$^x$Al(BH$_4$)$_{3+x}$, high hydrogen capacity complexes for hydrogen storage.

The reaction is between Al(BH$_4$)$_3$ and an M$^x$(BH$_4$), (e.g. M=Li, K, Na, Mg), resulting in M$^x$Al(BH$_4$)$_{3+}$. As an example a balanced equation for the formation of KAl(BH$_4$)$_4$ and CaAl(BH$_4$)$_5$ is as follows:

Al(BH$_4$)$_3$+KBH$_4$→KAl(BH$_4$)$_4$        (2)

Al(BH$_4$)$_3$+Ca(BH$_4$)$_2$→CaAl(BH$_4$)$_5$        (3)

The reaction can occur at room temperature but will require a multiple day reaction time. In order to accelerate the reaction, the starting powder such as KBH$_4$ is finely ground by ball milling. KBH$_4$ as an example was loaded under inert atmosphere in a pressure vessel. Al(BH$_4$)$_3$ is condensed at low temperature into the pressure vessel from Al(BH$_4$)$_3$ vapor. The starting materials were mixed in the pressure vessel and heated up to 70 C where the pressure in the vessel increased. The pressure increase is solely due to Al(BH$_4$)$_3$ going from liquid state to gaseous state.

The same reaction can occur between Al(BH$_4$)$_3$ and molten metal such as K at 70° C. as follows:

4/3Al(BH$_4$)$_3$+K(molten)→KAl(BH$_4$)$_4$+3Al        (4)

Solvent Method:

The same results of forming M$^x$Al(BH$_4$)$_{3+}$ can be obtained using a similar method which avoids dealing directly with volatile Al(BH$_4$)$_3$ in it its pure form.

Reaction 1 is done in solution where the product Al(BH$_4$)$_3$ dissolved in a solvent such as toluene and the LiCl is filtered out. The solution can then be reacted with M$^x$(BH$_4$)$_x$ (e.g. M=Li, K, Na, Mg). A reactant such as finely ground KBH$_4$ is added to the solvent containing Al(BH$_4$)$_3$ resulting in precipitating KAl(BH$_4$)$_4$.

Reaction 2 can occur in solvents containing Al(BH$_4$)$_3$:

Al(BH$_4$)$_3$-solvent (e.g. toulene)+KBH$_4$→KAl(BH$_4$)$_4$        (5)

4Al(BH$_4$)$_3$-solvent (e.g. toulene)+3K(molten)→3KAl(BH$_4$)$_4$+4Al        (6)

The formation of Al(BH$_4$)$_3$ adduct such as Al(BH$_4$)$_3$-TEDA is similar:

Al(BH$_4$)$_3$-solvent (e.g. toulene)+TEDA→Al(BH$_4$)$_3$-TEDA where Al(BH$_4$)$_3$-TEDA precipitates as a solid and can easily be filtered The products were determined by thermal gravimetric measurements and x-ray.

The above reactions and processes are designed to take advantage that complex metal hydrides offer an opportunity of compressing hydrogen into a lowest form of storage density. For instance, in a chemically bonded format such as a complex metal hydride, hydrogen shows a superior density that is desired for storage purposes. The present invention provides for high storage volume complex metal hydrides which alter and improve the thermodynamic properties of hydrogen rich compounds such as LiBH$_4$.

The above processes and reaction products take advantage of combining higher thermodynamically stable borohydrides with a lower stability alanate and/or Al—B compounds in order to achieve a thermodynamically tuned intermediate compound. For instance, substitution of a less electronegative Li and LiBH$_4$ with a more electronegative cation of the form M+X equals a lower bond strength of the B-H bond with a resulting T$_{des}$ value being lower. Similarly, substitution of the less stable AlH$_4$$^-$ with BH$_4$$^-$ brings about a lowering of the hydrogen T$_{des}$ value.

EXAMPLES

Example 1

Synthesis using unsolvated Al(BH$_4$)$_3$

Unsolvated Al(BH$_4$)$_3$ was synthesized by combining in a Schlenk line flask under an Ar atmosphere 1 mole of aluminum chloride (AlCl$_3$) with 3 moles of unsolvated lithium borohydride (LiBH$_4$). The synthesis was carried out at 65° C. and under vacuum for 3 hours. The LiBH$_4$ was premilled to reduce its particle size and enhance the yield of Al(BH$_4$)$_3$.

FIG. 1 shows the Raman shifts for the prepared unsolvated Al(BH$_4$)$_3$.

The unsolvated Al(BH$_4$)$_3$ was then reacted with KBH$_4$ in a closed and evacuated vessel at 65° C. and −14 psig for 72 hours to produce KAl(BH$_4$)$_4$. Excess Al(BH$_4$)$_3$ was utilized such that twice the stoichiometric amount needed was present.

Figure 2:
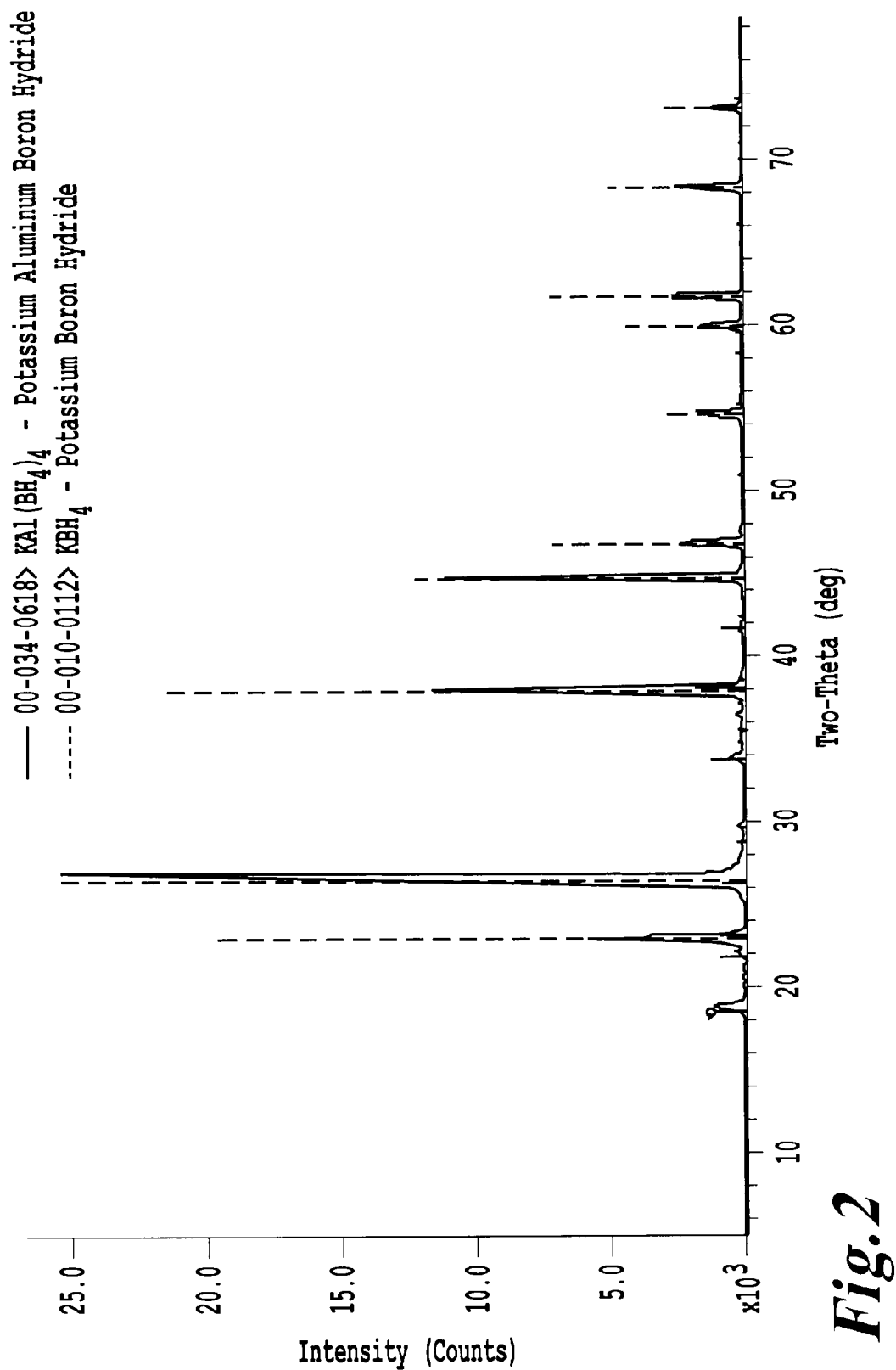
FIG. 2 is an X-ray diffraction pattern showing unsolvated Al(BH$_4$)$_3$ stabilized using KBH$_4$ (i.e., KAl(BH$_4$)$_4$)

FIG. 2 shows the X-ray diffraction pattern for the unsolvated Al(BH$_4$)$_3$ stabilized using KBH$_4$. The X-ray diffraction pattern shows the presence of KAl(BH$_4$)$_4$.

Figure 3:
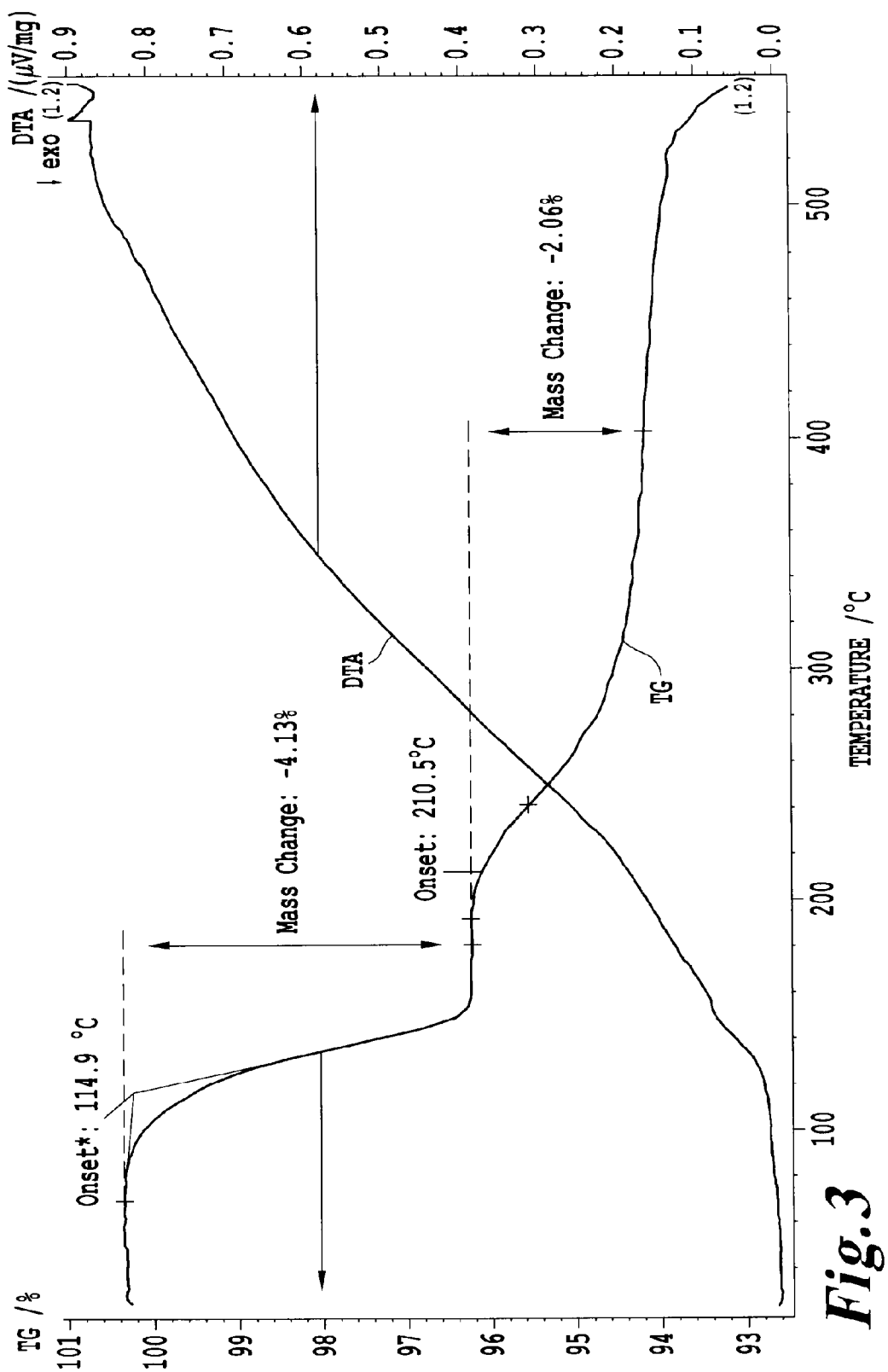
FIG. 3 shows the thermal hydrogen storage properties of KAl(BH$_4$)$_4$ in plots versus temperature of TG and DTA.

FIG. 3 shows the thermal hydrogen storage properties of the formed KAl(BH$_4$)$_4$. Hydrogen release is evident in the 4.13 wt % weight loss onset at 114.9 C.

Example 2

Synthesis Using Solvated Al(Bh$_4$)$_3$

Solvated aluminum borohydride (Al(BH$_4$)$_3$) was synthesized by combining in a Schlenk line flask under an Ar atmosphere 1 molar aluminum chloride (AlCl$_3$) in toluene with 3 molar lithium borohydride (LiBH$_4$) in toluene.

The stabilized complex compound was then prepared by combining the solvated Al(BH$_4$)$_3$ and a stabilization agent of LiBH$_4$ or TEDA. Excess solvated Al(BH$_4$)$_3$ was utilized such that 4 times the stoichiometric amount needed was present. The stabilization reactions were carried out under an Ar atmosphere at 25° C. and 0 psig for 8 hours. LiAl(BH$_4$)$_4$ and Al(BH$_4$)$_3$:TEDA were produced by the stabilization reactions.

Figure 4:
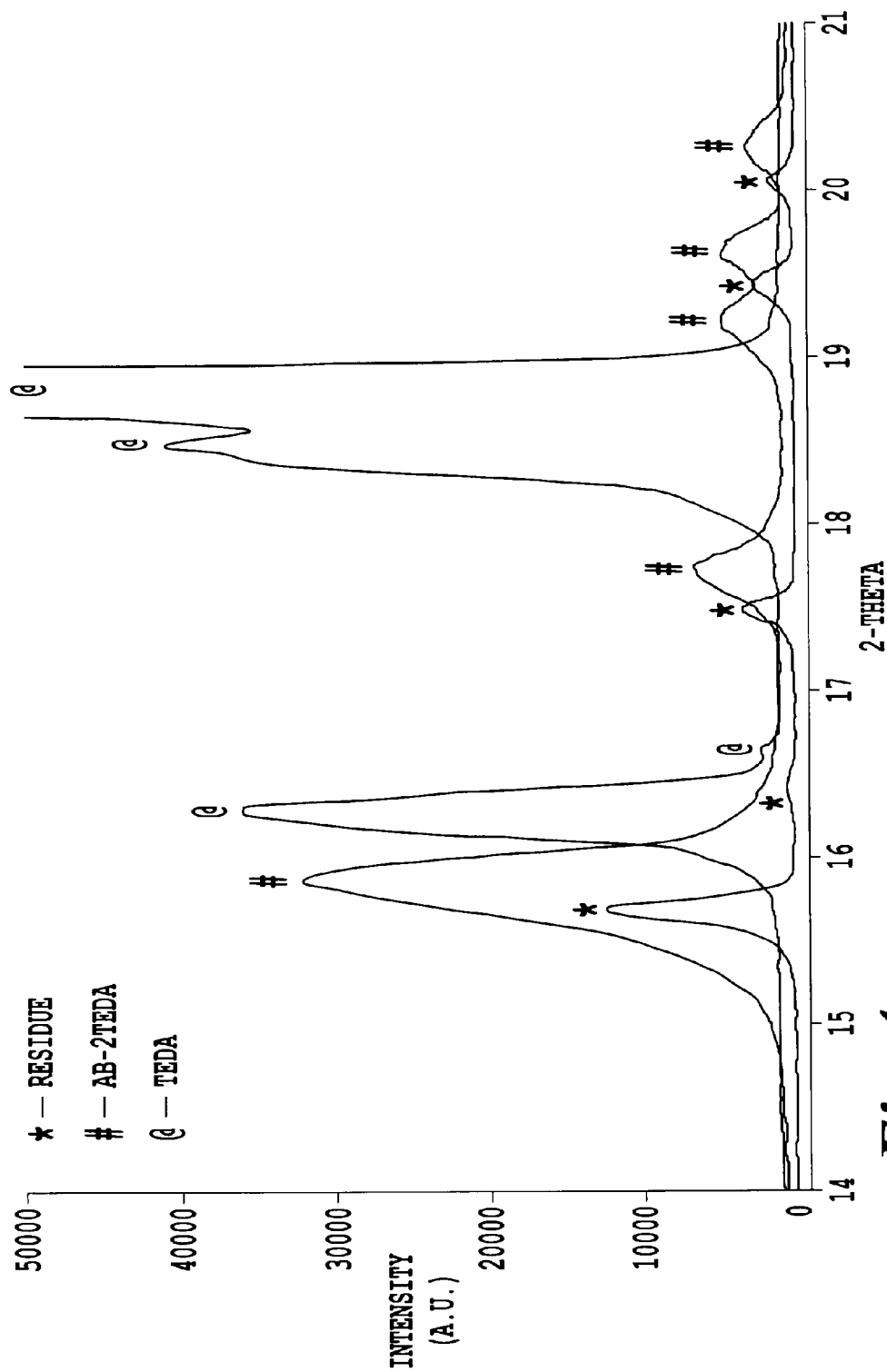
FIG. 4 is an X-ray diffraction pattern following the stabilization of solvated Al(BH$_4$)$_4$ in toluene with triethylene diamine (TEDA).

FIG. 4 is an X-ray diffraction pattern following the stabilization of solvated Al(BH$_4$)$_3$ in toluene with triethylene diamine (TEDA). The formation of new crystalline stabilized Al(BH$_4$)$_3$:TEDA can be seen marked with #. The product obtained following desorption is marked with *. The results are compared to purchased TEDA marked with @.

Figure 5:
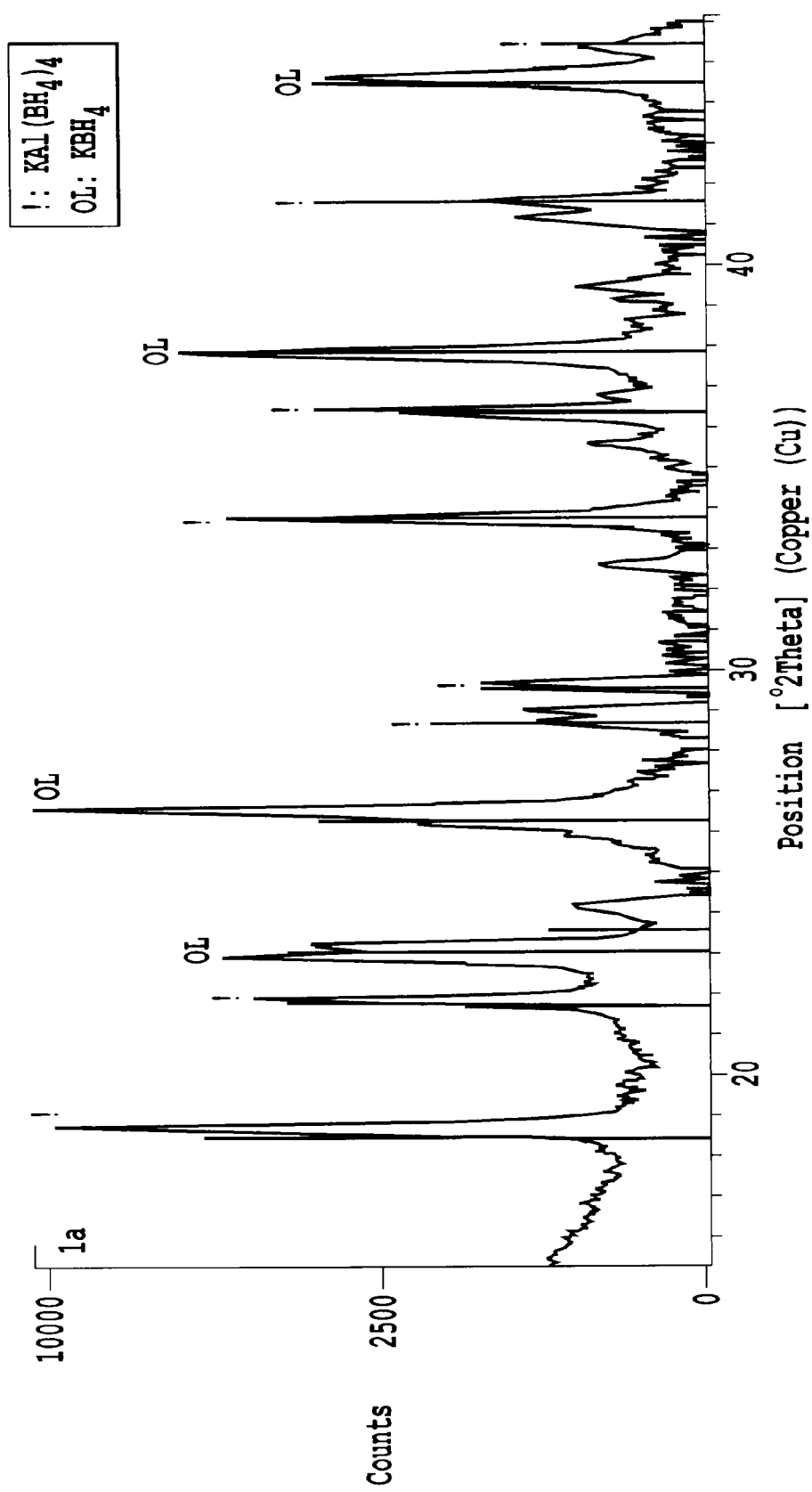
FIG. 5 shows the XRD Analysis of Al(BH4)$_3$ stabilized using KBH4 using direct synthesis method.

FIG. 5 shows the XRD Analysis of Al(BH4)3 stabilized using KBH4 using direct synthesis method. The formation of new crystalline compound K[Al(BH4)4] is confirmed.

Figure 6:
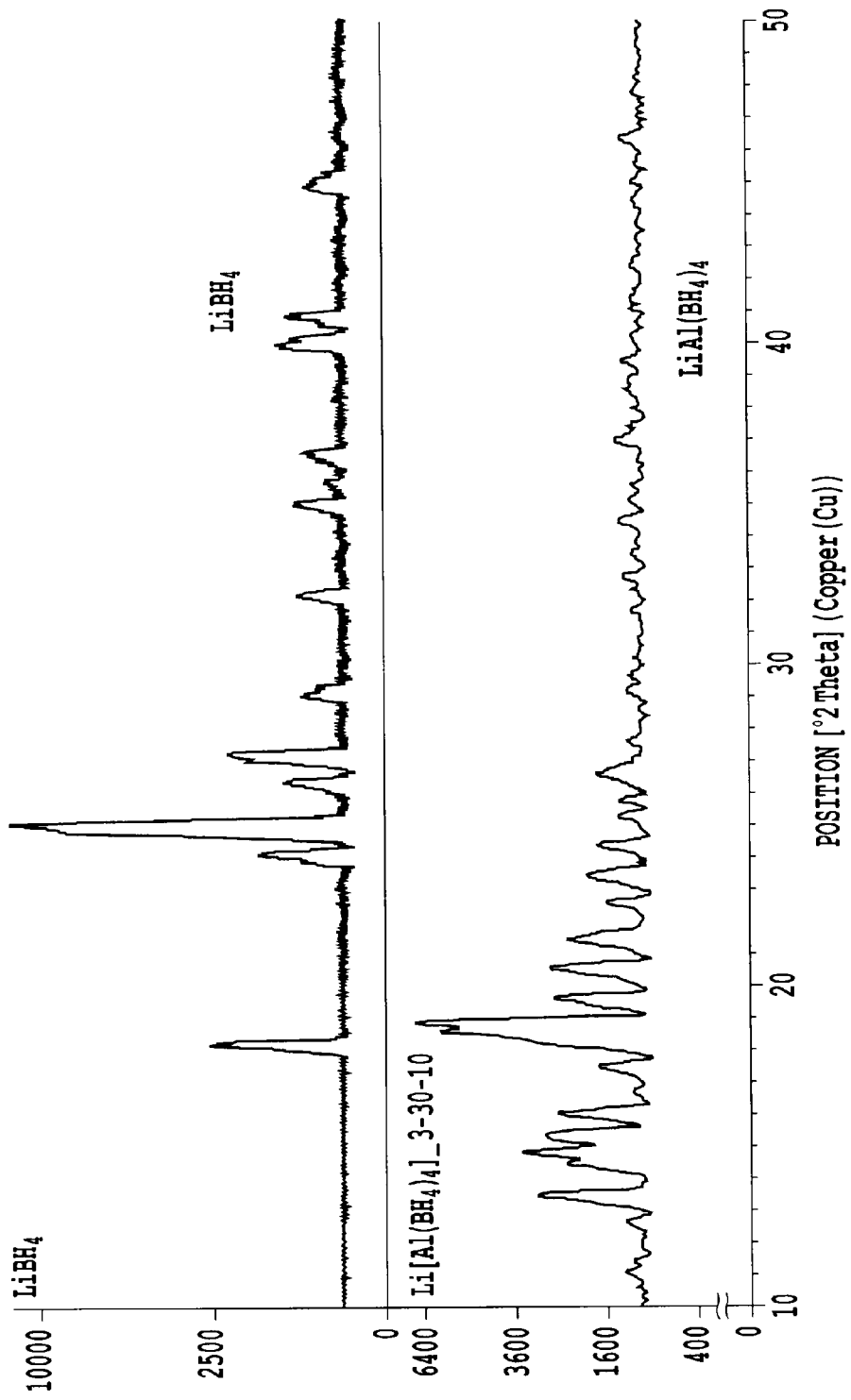
FIG. 6 shows the XRD Analysis of Al(BH4)$_3$ stabilized with LiBH4 using direct synthesis method.

FIG. 6 shows the XRD Analysis of Al(BH4)3 stabilized with LiBH4 using direct synthesis method. The formation of new crystalline compound Li[Al(BH4)4] (lower graph) is confirmed.

Figure 7:
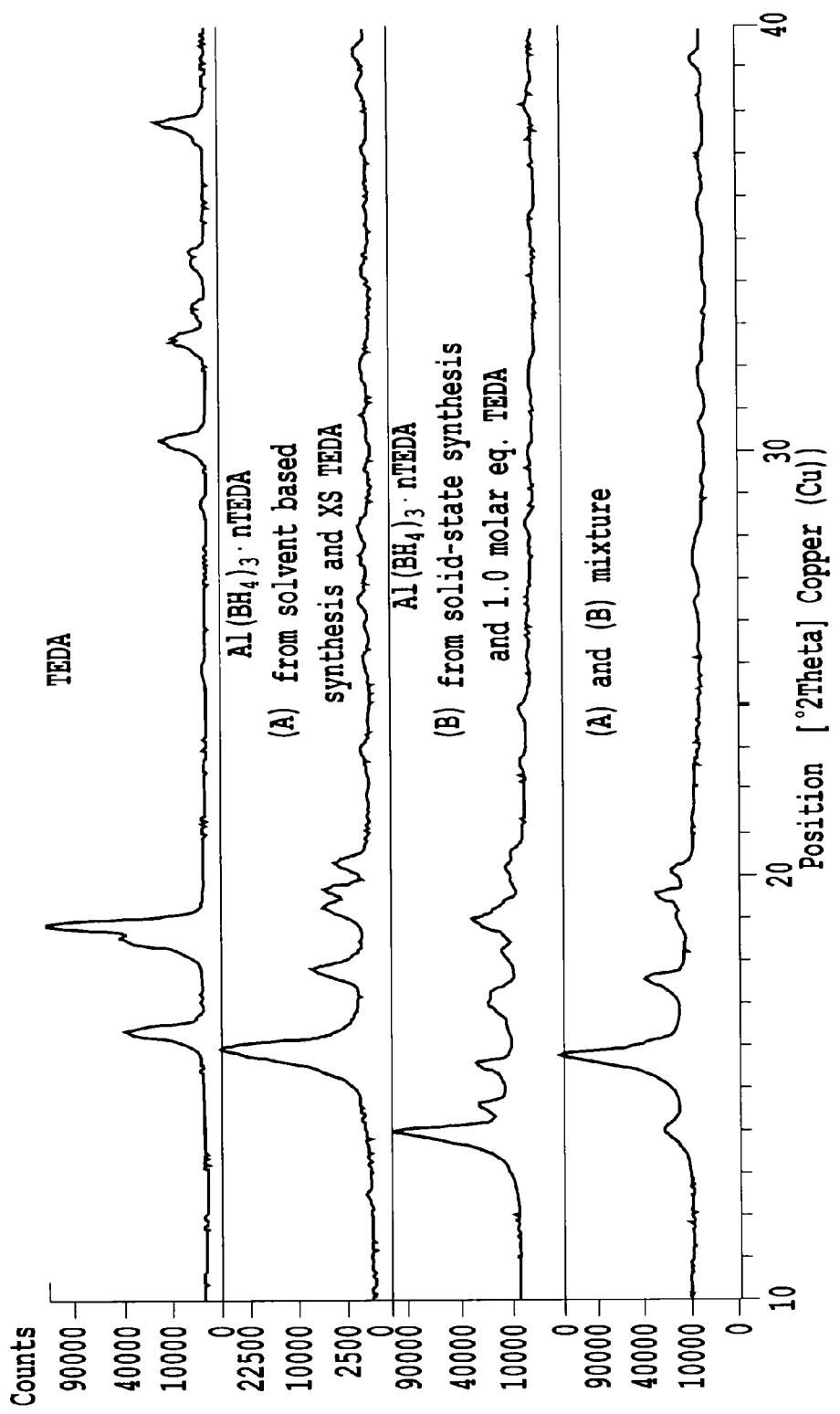
FIG. 7 shows the stabilization of Al(BH4)$_3$ with Triethylene Diamine C6N2H 12 using direct formation and solvent method.
Figure 9:
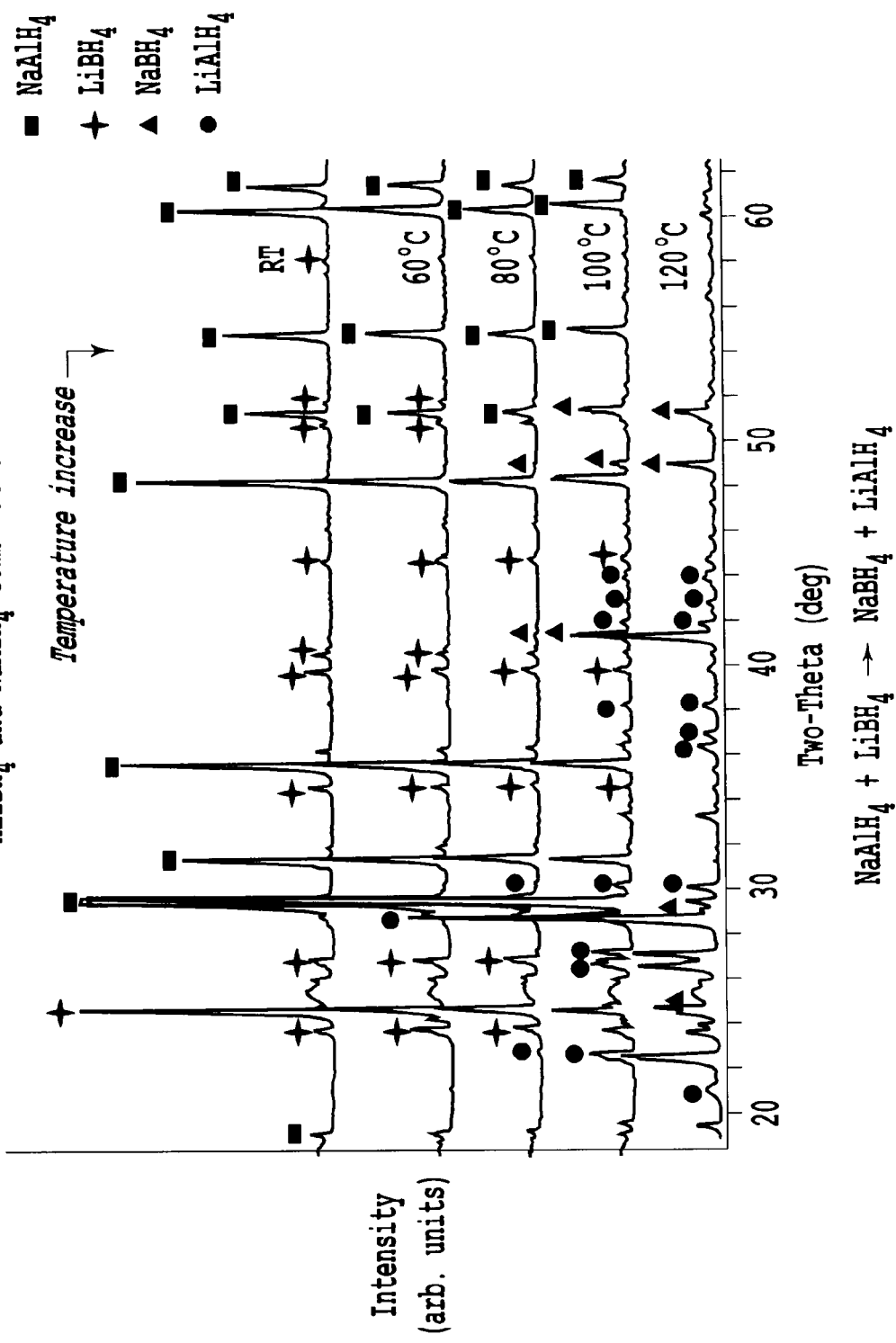
Figure 10:
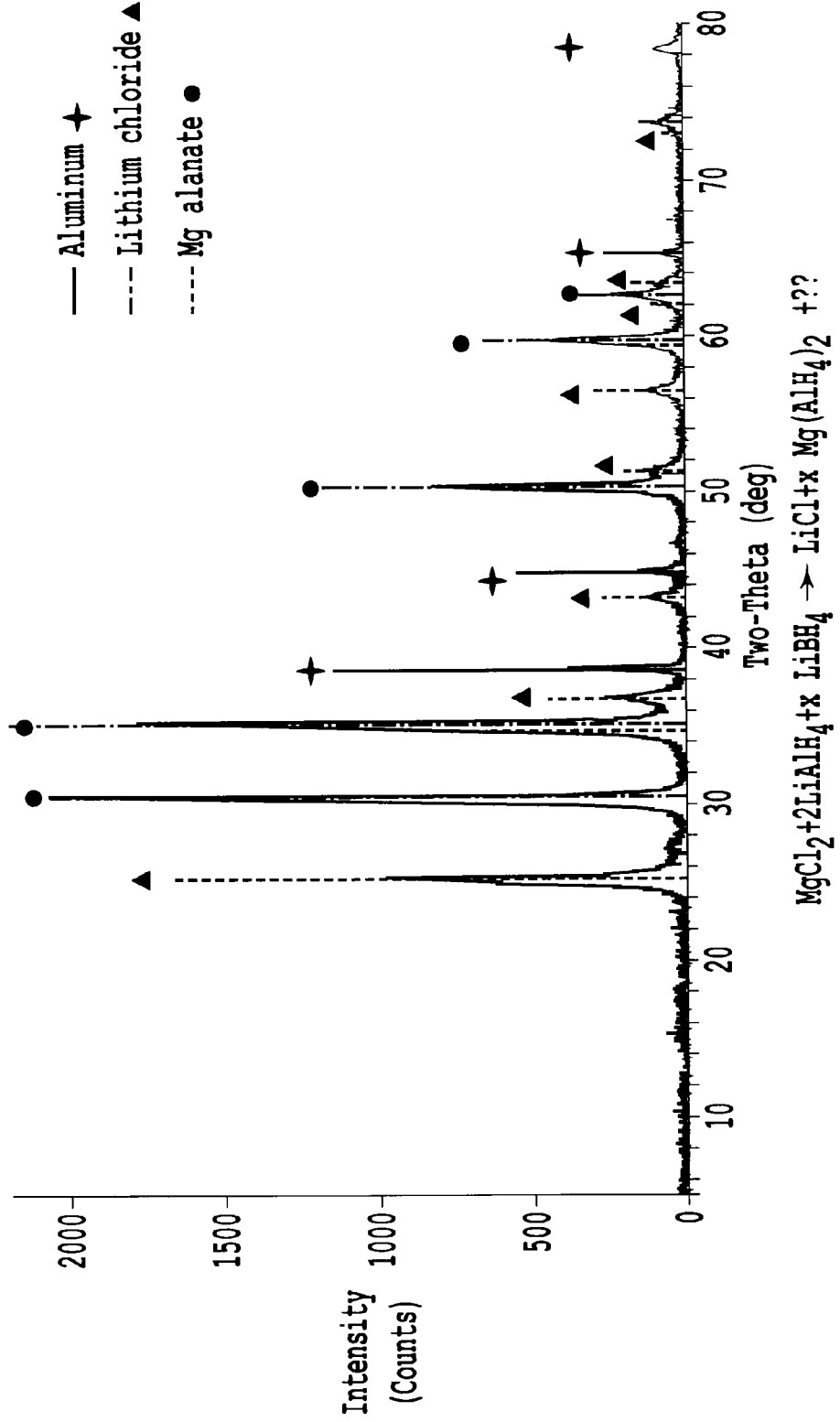
Figure 11:
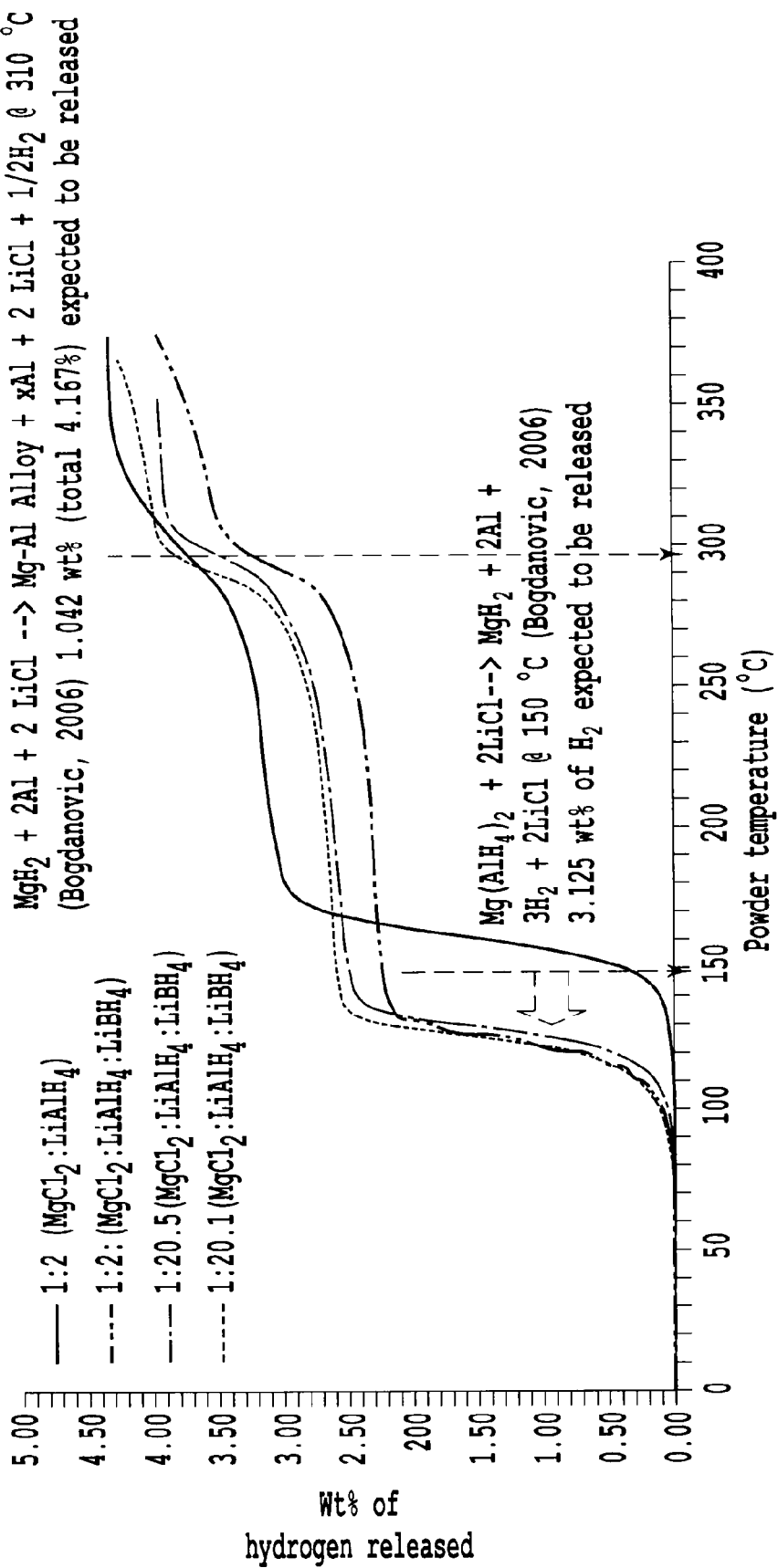
Figure 12:
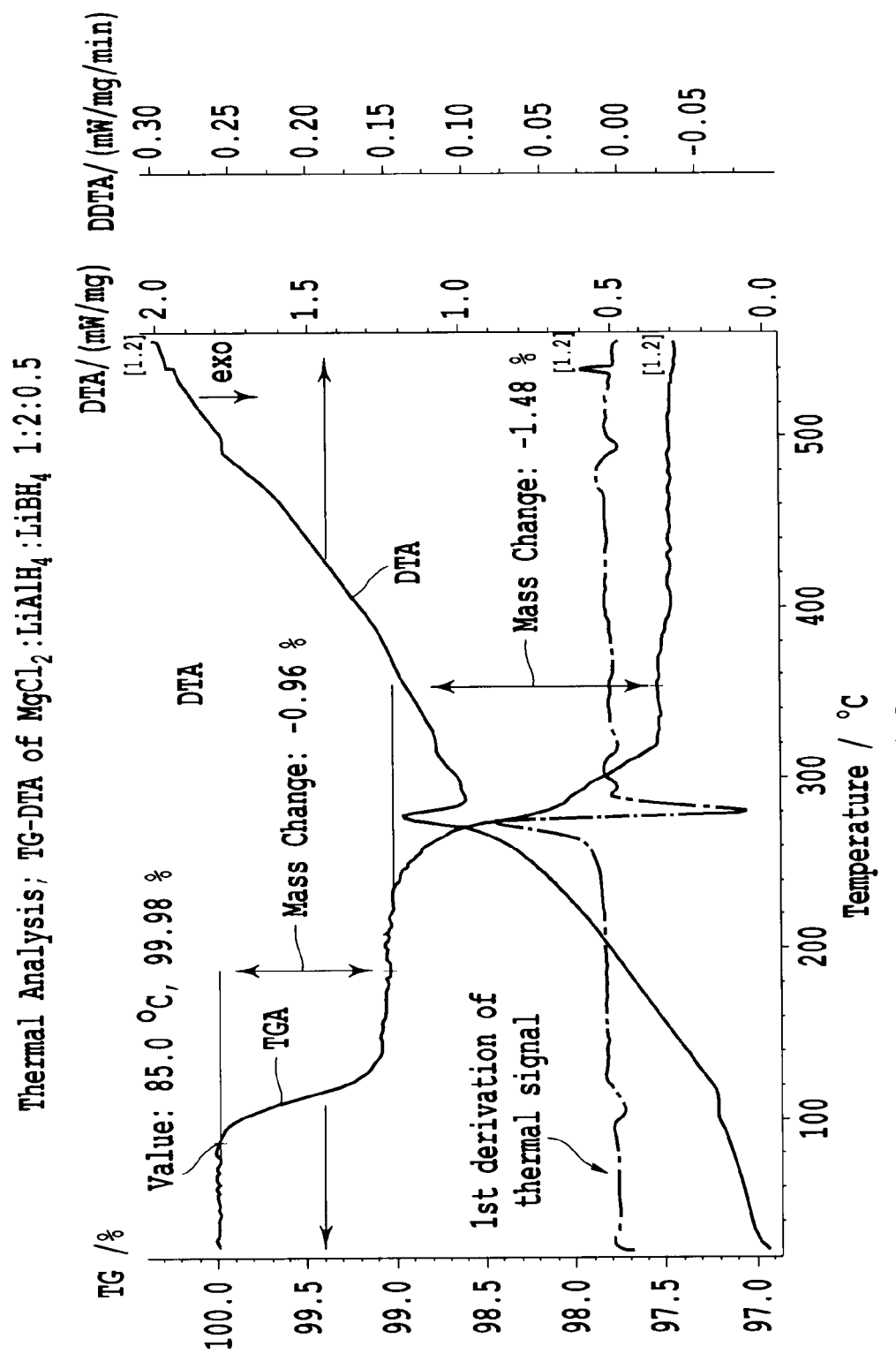
Figure 13:
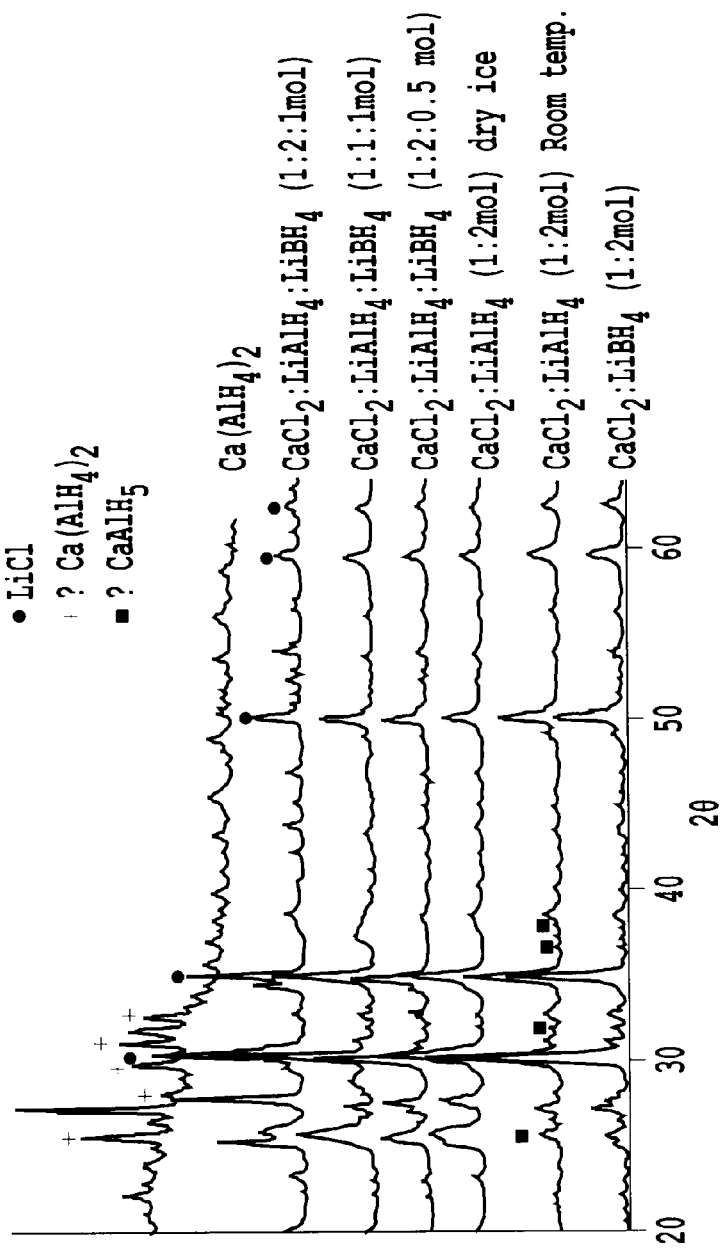
Figure 14:
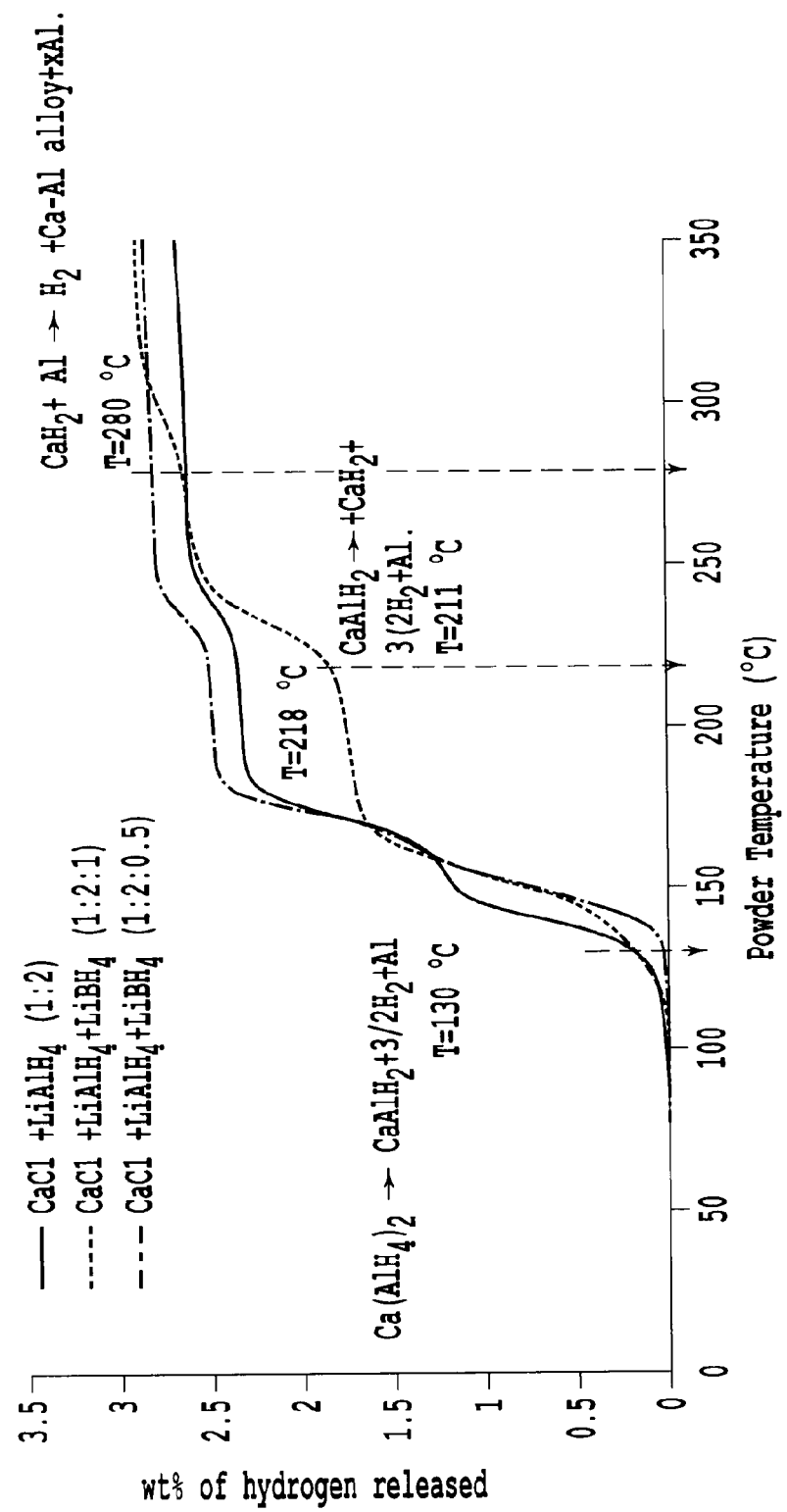
Figure 15A:
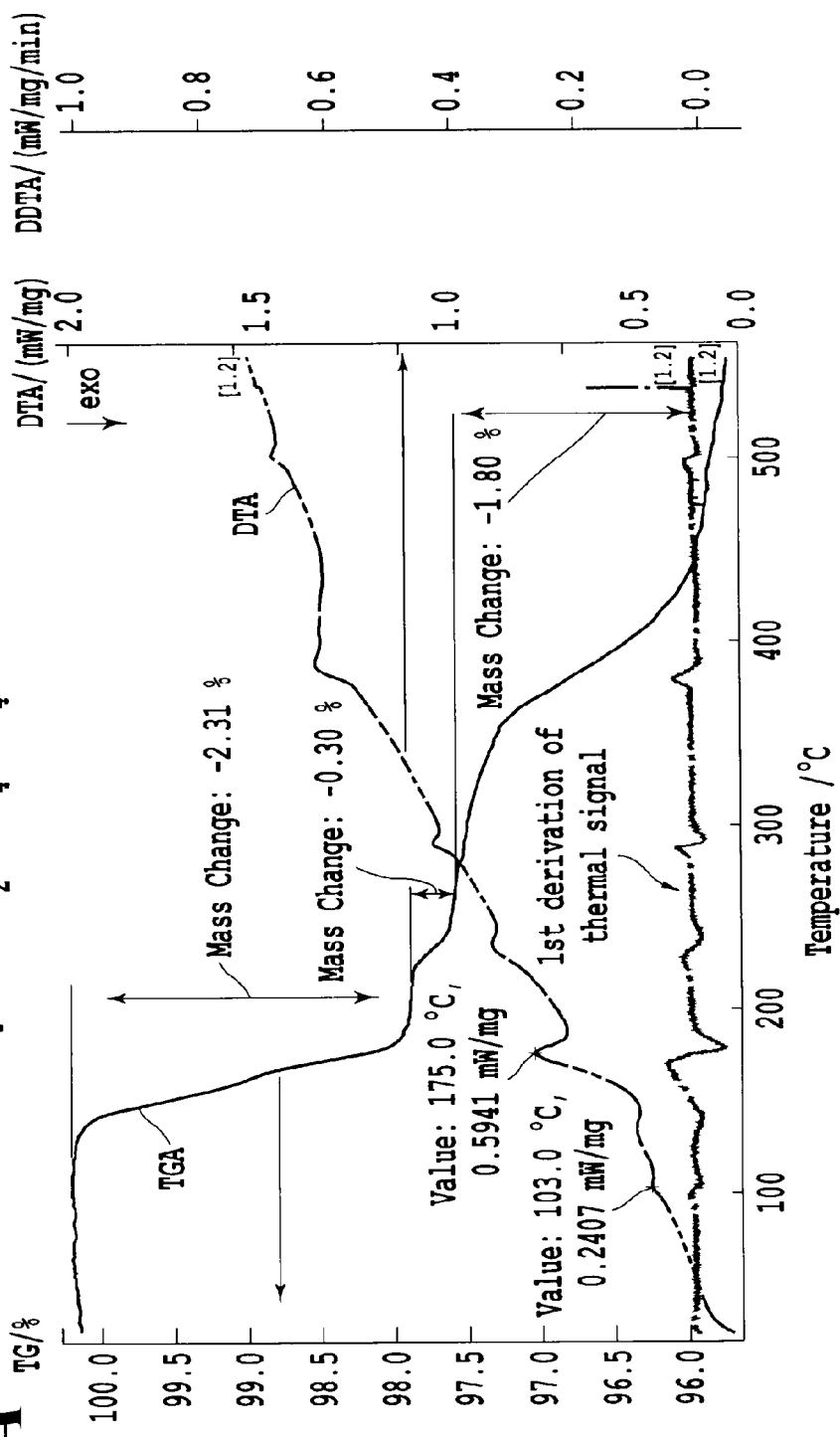
Figure 15B:
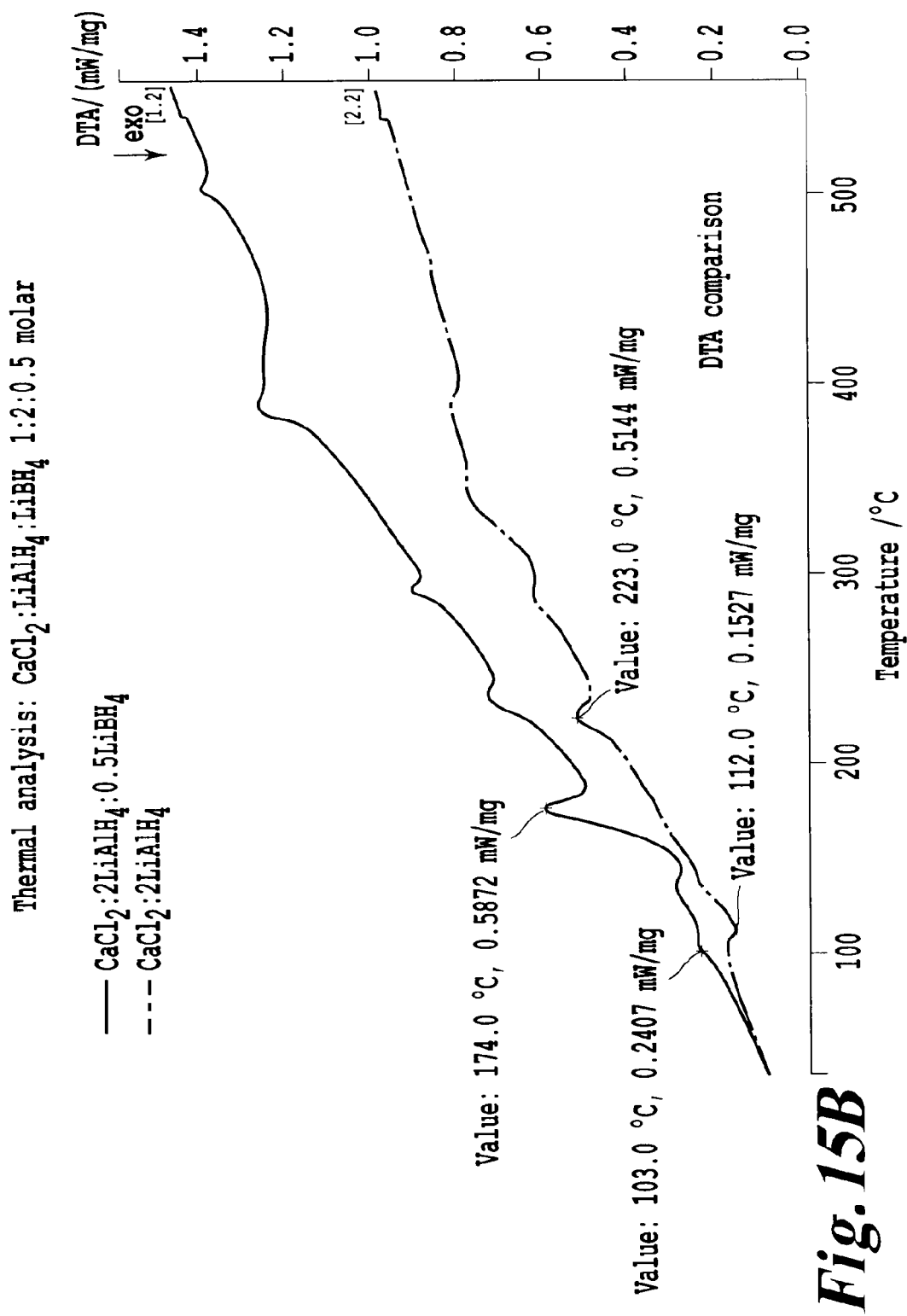
Figure 16B:
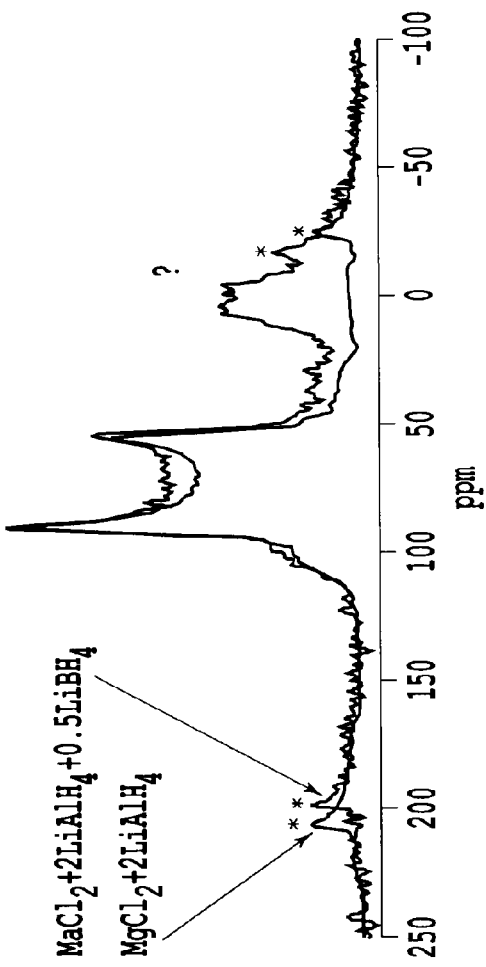
Figure 17A:
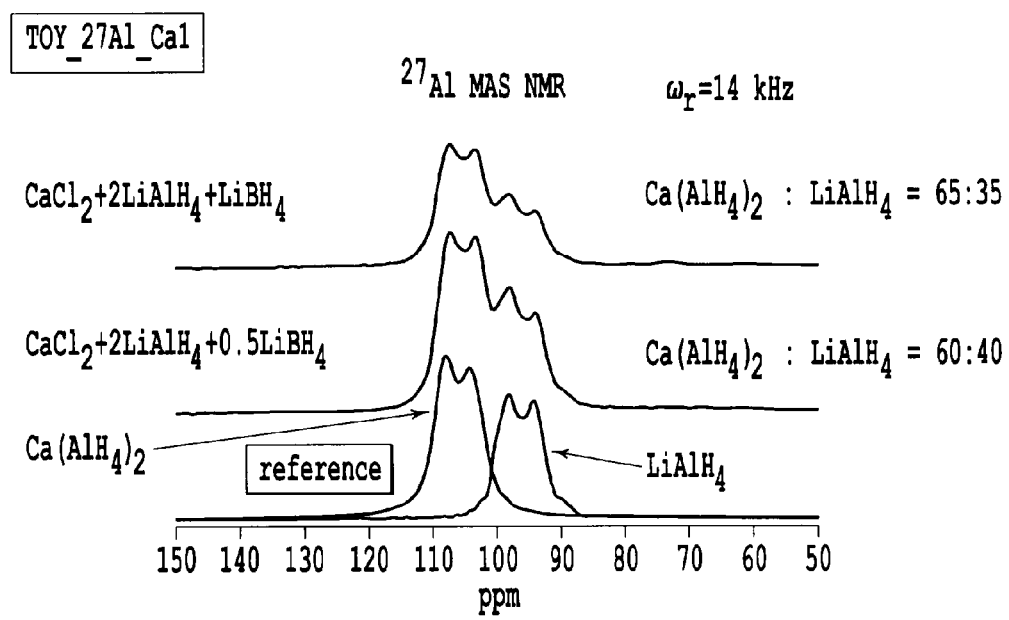
Figure 17B:
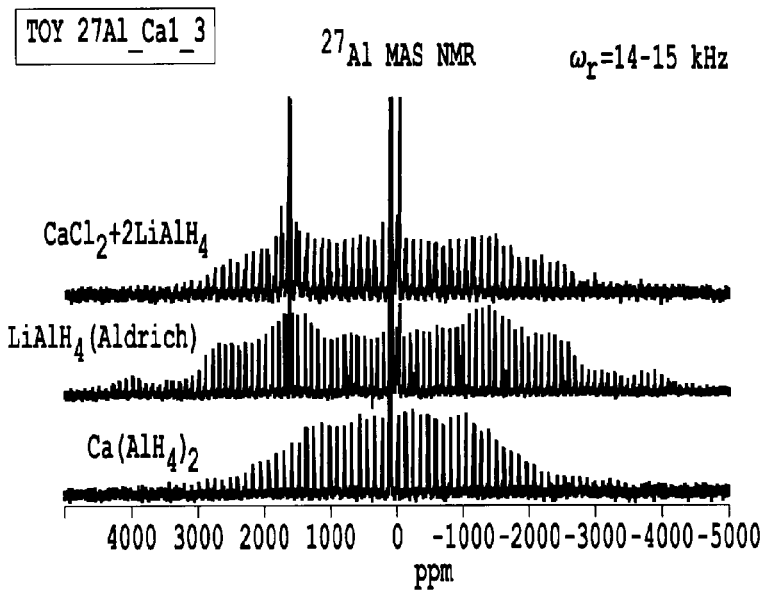

FIG. 7 shows the stabilization of Al(BH4)3 with Triethylene Diamine C6N2H12 using direct formation and solvent method. X-ray diffraction obtained following the stabilization of Al(BH4)3 with Triethylene Diamine using (A) excess TEDA using solvent method, (B) 1:1 molar stochiometric TEDA using direct formation and (C) A mixture of the stoichiometric and excess TEDA stabilized Al(BH4)3. Formation of new crystalline Al(BH4)3.xTEDA compound was obtained, where x=1 or 2 molar.

FIGS. 8-18 describe a number of experimental protocols setting forth the reactants and reaction conditions and characterization protocols showing the formation of useful complex hydrides, the complex hydrides being formed by a variety of different chemical processes. Further, the materials, reactions, and conditions set forth in U.S. Pat. No. 7,094,387, and which is incorporated herein by reference are also useful with the materials and processes of the present invention.

The above written description of the invention provides a manner and process of making and using it such that any person skilled in this art is enabled to make and use the same, this enablement being provided in particular for the subject matter of the appended claims, which make up a part of the original description.

As used herein, the phrases "selected from the group consisting of," "chosen from," and the like include mixtures of the specified materials. Terms such as "contain(s)" and the like as used herein are open terms meaning 'including at least' unless otherwise specifically noted. The term "mentioned" notes exemplary embodiments, and is not limiting to certain species. As used herein the words "a" and "an" and the like carry the meaning of "one or more."

All references, patents, applications, tests, standards, documents, publications, brochures, texts, articles, etc. mentioned herein are incorporated herein by reference. Where a numerical limit or range is stated, the endpoints are included. Also, all values and subranges within a numerical limit or range are specifically included as if explicitly written out.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein. In this regard, certain embodiments within the invention may not show every benefit of the invention, considered broadly.

What is claimed is:

1. A hydrogen storage composition, comprising:
a complex compound having the composition $$M^{x+}Al^{3+}(BH_4^-)_{3+x},$$

wherein
M is a metal other than Al selected from the group consisting of alkali metals, alkaline earth metals, transition metals and lanthanide rare earth elements;
x is a valence number of 1, 2, 3, 4, 5, 6, 7 or 8,
the complex compound is a solid material, and
the hydrogen storage composition is capable of releasing hydrogen at a temperature of less than 200° C.

2. The hydrogen storage composition according to claim 1, wherein M is an alkali metal.

3. The hydrogen storage composition according to claim 2, wherein
M is selected from the group consisting of Li, Na and K; and x is 1.

4. The hydrogen storage composition according to claim 1, wherein M is an alkaline earth metal.

5. The hydrogen storage composition according to claim 4, wherein
the M is selected from the group consisting of Mg, Ca, Sr and Ba; and
x is 2.

6. A method to prepare a hydrogen storage composition, the method comprising:
reacting Al(BH$_4$)$_3$ with a stabilization agent to obtain
a complex compound having the composition $$M^{x+}Al^{3+}(BH_4^-)_{3+x},$$

wherein
M is a metal other than Al selected from the group consisting of alkali metals, alkaline earth metals, transition metals and lanthanide rare earth elements;
x is a valence number of 1, 2, 3, 4, 5, 6, 7 or 8,
the complex compound is a solid material, and
the hydrogen storage composition is capable of releasing hydrogen at a temperature of less than 200° C.

7. The method according to claim 6, wherein
the Al(BH$_4$)$_3$ is unsolvated Al(BH$_4$)$_3$; and
the unsolvated Al(BH$_4$)$_3$ is synthesized by reacting AlCl$_3$ with LiBH$_4$ in an inert environment.

8. The method according to claim 6, wherein
the Al(BH$_4$)$_3$ is solvated Al(BH$_4$)$_3$; and
the solvated Al(BH$_4$)$_3$ is synthesized by reacting AlCl$_3$ with LiBH$_4$ in an aprotic solvent.

9. A hydrogen storage composition, comprising:
a complex compound having the composition $$M1^{x+}M2^{y+}Al^{3+}(BH_4^-)_{3+x+y},$$

wherein
M1 and M2 are different metals other than Al selected from the group consisting of alkali metals, alkaline earth metals, transition metals and lanthanide rare earth elements;
x is a valence number of 1, 2, 3, 4, 5, 6, 7 or 8;
y is a valence number of 1, 2, 3, 4, 5, 6, 7 or 8
the complex compound is a solid material, and
the hydrogen storage composition is capable of releasing hydrogen at a temperature of less than 200° C.

10. The hydrogen storage composition according to claim 9, wherein M1 and M2 are different metals selected from the group consisting of alkali metals.

11. The hydrogen storage composition according to claim 10, wherein
metals M1 and M2 are selected from the group consisting of Li, Na and K;
x is 1; and
y is 1.

12. The hydrogen storage composition according to claim 9, wherein M1 and M2 are different metals selected from the group consisting of alkaline earth metals.

13. The hydrogen storage composition according to claim 12, wherein
the metals M1 and M2 are different metals selected from the group consisting of Mg, Ca, Sr and Ba;
x is 2; and
y is 2.

14. A method of making a hydrogen storage composition, the method comprising:
reacting $Al(BH_4)_3$ with two stabilization agents to obtain a complex compound having the composition $$M1^{x+}M2^{y+}Al^{3+}(BH_4^-)_{3+x+y},$$

wherein
M1 and M2 are different metals other than Al selected from the group consisting of alkali metals, alkaline earth metals, transition metals and lanthanide rare earth elements;
x is a valence number of 1, 2, 3, 4, 5, 6, 7 or 8;
y is a valence number of 1, 2, 3, 4, 5, 6, 7 or 8
the complex compound is a solid material, and
the hydrogen storage composition is capable of releasing hydrogen at a temperature of less than 200° C.

15. A hydrogen storage composition, comprising:
a complex compound having a formula $$Al(BH_4)_3{:}R,$$

wherein
R is an organic adduct,
the complex compound is a solid material, and
the hydrogen storage composition is capable of releasing hydrogen at a temperature of less than 200° C.

16. The hydrogen storage composition according to claim 15, wherein R is selected from the group consisting of amines and phosphines.

17. The hydrogen storage composition according to claim 15, wherein R is selected from the group consisting of trimethyl amine, trimethyl phosphine and triethylene diamine.

18. A method to prepare the hydrogen storage composition of claim 15, the method comprising
reacting $Al(BH_4)_3$ with a stabilization agent comprising an organic adduct; and
producing the complex compound of formula $$Al(BH_4)_3{:}R,$$

wherein
R is an organic adduct.

19. The method according to claim 18, wherein
the $Al(BH_4)_3$ is unsolvated $Al(BH_4)_3$; and
the unsolvated $Al(BH_4)_3$ is synthesized by reacting $AlCl_3$ with $LiBH_4$ in an inert environment.

20. The method according to claim 18, wherein
the $Al(BH_4)_3$ is solvated $Al(BH_4)_3$; and
the solvated $Al(BH_4)_3$ is synthesized by reacting $AlCl_3$ with $LiBH_4$ in an aprotic solvent.

21. A hydrogen storage composition, comprising a compound selected from the group of compounds consisting of:
a compound of the formula $K[Al(BH4)4]$ having the XRD spectrum shown in FIG. 5,
a compound of the formula $Li[Al(BH4)4]$ having the XRD spectrum shown in FIG. 6,
a compound of the formula $Al(BH4)3 \cdot xTEDA$ where x=1 or 2 having the X-ray diffraction spectrum shown in FIG. 7.

* * * * *